US008612059B2

(12) United States Patent
Chamblin et al.

(10) Patent No.: US 8,612,059 B2
(45) Date of Patent: Dec. 17, 2013

(54) POWER GENERATION UNIT STARTUP EVALUATION

(75) Inventors: Antonio Chamblin, Adamsville, AL (US); Kenneth Clifford Barnett, Birmingham, AL (US)

(73) Assignee: Southern Company Services, Inc., Atlanta, GA (US)

( * ) Notice: Subject to any disclaimer, the term of this patent is extended or adjusted under 35 U.S.C. 154(b) by 398 days.

(21) Appl. No.: 13/193,809

(22) Filed: Jul. 29, 2011

(65) Prior Publication Data

US 2013/0030582 A1 Jan. 31, 2013

(51) Int. Cl.
*G06F 1/26* (2006.01)
(52) U.S. Cl.
USPC .......................................... 700/287; 700/286
(58) Field of Classification Search
None
See application file for complete search history.

(56) References Cited

U.S. PATENT DOCUMENTS

| 8,149,602 B2 * | 4/2012 | Darshan .......................... 363/49 |
| 2012/0151921 A1 * | 6/2012 | Sathyanarayana et al. ..... 60/646 |

* cited by examiner

*Primary Examiner* — Ryan Jarrett
(74) *Attorney, Agent, or Firm* — Thomas Horstemeyer LLP

(57) ABSTRACT

Various methods and systems are provided for evaluation of events such as the startup of power generation units. In one embodiment, a method includes obtaining operational data associated with a power generation unit, the operational data corresponding to a predefined period of time; determining start and end times for a startup phase associated with the power generation unit based upon a set of predefined startup conditions corresponding to the startup phase; and generating a network page including the start and times. In another embodiment, a system includes a unit evaluation system executable in a computing device that includes logic that obtains operational data associated with a power generation unit, the operational data corresponding to a predefined period of time and logic that determines start and end times for an event phase associated with the power generation unit based upon a set of predefined conditions corresponding to the event phase.

20 Claims, 7 Drawing Sheets

UNIT EVALUATION

User: Burdell, George        Roles: SuperAdmin        Database: SPTRS

Home | Maintenance ▼ | Administration ▼ | Reports | Logout

OPCO/Plant: <All>      Unit Type: <All>      [Clear Filters]  [Search]

Units (44 found)    Page 1 2 3 4 5    Page Size: 10       Add unit

| OPCO | Unit | Type | Sub Type | Rule Cnt | Boiler Tech Type | Boiler Sub Type | Unit ID |
|---|---|---|---|---|---|---|---|
| APC | Pierre 2 | Fossil | Coal | 0 | Drum | Medium (GE) | 10013 |
| APC | Pierre 3 | Fossil | Coal | 0 | Drum | Medium (GE) | 10019 |
| APC | Pierre 4 | Fossil | Coal | 11 | Drum | Medium (GE) | 10021 |
| APC | Barney 1 | Fossil | Coal | 11 | Drum | Medium (GE) | 10014 |
| APC | Barney 3 | Fossil | Coal | 27 | SuperCritical | CE (GE) | 10034 |
| APC | Jorge 10 | Fossil | Coal | 27 | SuperCritical | CE (GE) | 10038 |
| APC | Jorge 8 | Fossil | Coal | 11 | Drum | Medium (GE) | 10018 |

FIG. 2

UNIT EVALUATION

User: Burdell, George        Roles: SuperAdmin        Database: SPTRS

Home | Maintenance ▼ | Administration ▼ | Reports | Logout

*Startup at Pierre 4*
Event ID:                93
Description:             Startup of Pierre 4

Operating Company:       APC
Plant Unit:              Pierre 4
Technology (Boiler) Type: Drum Medium (GE)
Estimated Start Date:    10/20/2010     06:00 PM
Estimated End Date:      10/21/2010     12:00 PM (noon)
Data Imported Date:      02/25/2011  08:54:05 AM
Data Imported Message:
Phases Calculated Date:  02/25/2011  08:55:53 AM
Phases Calculated Message:

☐ Reset data import and calculation event
  so that the event will be processed again.

FIG. 3

POWER GENERATION UNIT STARTUP EVALUATION

BACKGROUND

The startup of power generating units takes place over an extended period of time. There are significant economic advantages to bringing the unit to its full power-producing capabilities as quickly as feasible so that more energy is available to the power grid. However, the speed at which the unit is brought to full power needs to be balanced against the potential long-term damage to the unit's equipment if it is overly stressed during an accelerated startup.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 2 illustrates an example of a network page including a listing of power generation units for selection of a power generation unit for evaluation of an event by the system of FIG. 1 in accordance with various embodiments of the present disclosure.

FIG. 3 illustrates an example of a network page configured to obtain information for evaluation of an event by the system of FIG. 1 in accordance with various embodiments of the present disclosure.

DETAILED DESCRIPTION

Figure 1:
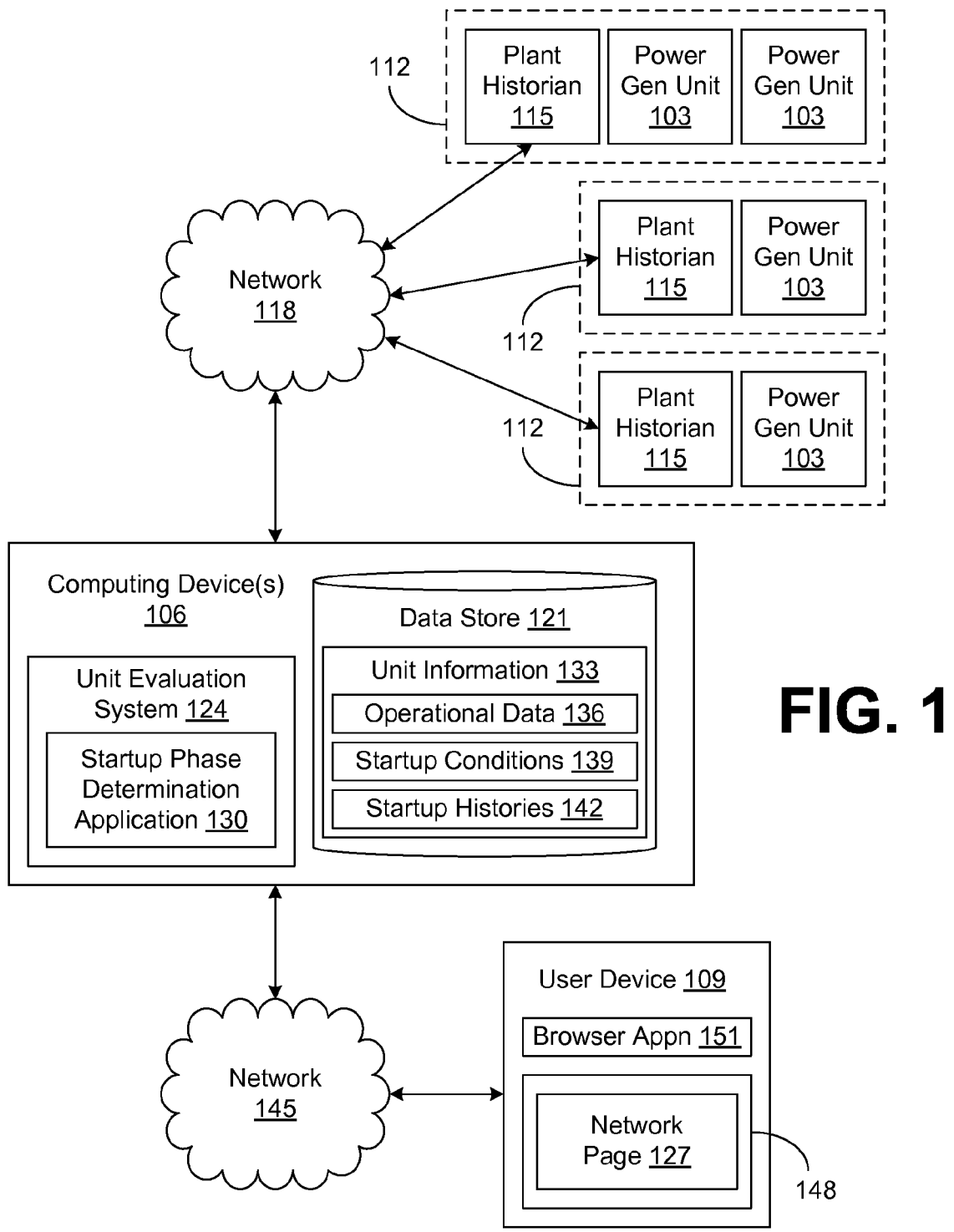
FIG. 1 is a graphical representation of an example of a system for evaluating an event of a power generation unit in accordance with various embodiments of the present disclosure.

Disclosed herein are various embodiments of systems and methods related to evaluation of events such as the startup of power generation units. Reference will now be made in detail to the description of the embodiments as illustrated in the drawings, wherein like reference numbers indicate like parts throughout the several views.

The startup of power generating units such as, e.g., fossil fuel units takes place over time as the startup sequence passes through multiple phases. For example, the startup of a typical fossil fuel unit generally passes through 3 or 4 (or more) distinct phases (depending on the technology type or boiler type of the unit). The startup phases of a fossil fuel unit can include, but are not limited to: (1) a boiler firing phase where operation is initiated; (2) a boiler ramping phase where the boiler pressure is increased; (3) a turbine rolling phase where the turbine is prepared for loading; and (4) a turbine loading phase. For each of these phases, an optimal length of time for completion of the phase can be targeted that balances the benefits of making the unit's power available for distribution with the risk for damage to the unit itself. The ability to accurately calculate, record, and analyze the actual start and end times of each phase associated with a power generating unit's startup facilitates optimization of the efficiencies that can be realized.

Referring to FIG. 1, shown is an example of a system 100 for evaluating an event such as a startup of a power generation unit 103, e.g., a fossil fuel unit. The system 100 includes one or more computing device(s) 106, one or more user device(s) 109, and a plurality of power generation units 103 located at one or more plant site(s) 112. Every power generating unit 103 has a technology type or boiler type associated with it. The system 100 also includes one or more plant historian(s) 115 configured to collect and maintain operational data for one or more power generation unit(s) 103. Each plant historian 115 is communicatively coupled to the computing device(s) 106. In the embodiment of FIG. 1, the plant historians 115 are communicatively coupled to the computing device(s) 106 through a network 118 such as, e.g., the Internet, intranets, extranets, wide area networks (WANs), local area networks (LANs), wired networks, wireless networks, networks configured for communication over a power grid, or other suitable networks, etc., or any combination of two or more such networks.

In the example of FIG. 1, a plant historian 115 is located at each plant site 112. In other embodiments, the plant historian 115 may be a distributed system with, e.g., a first portion configured to collect operational data for one or more power generation unit(s) 103 located at the plant site 112 and a second portion configured to store the collected operational data at another location. For example, each collection portion may send the collected operational data to a central data store, where operational data for a plurality of power generation units 103 is stored. In some embodiments, each plant historian 115 includes a data store to store the operational data corresponding to the power generation unit(s) 103 associated with the plant historian 115.

The computing device(s) 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise, for example, a cloud computing resource, a grid computing resource, and/or any other distributed computing arrangement. Such computing devices 106 may be located in a single installation or may be dispersed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 121 that is accessible to the computing device 106. The data store 121 may be representative of a plurality of data stores 121 as can be appreciated. The data stored in the data store 121, for example, is associated with the operation of the various applications and/or functional entities described below.

The components executed on the computing device 106 include, for example, a unit evaluation system 124 and other systems, applications, services, processes, engines, or functionality not discussed in detail herein. The unit evaluation system 124 is executed in order to facilitate the evaluation of an event such as the startup of one or more power generation unit(s) 103. The unit evaluation system 124 can generate network pages 127 such as web pages or other types of network content that are provided to a user device 109 in response to a request for the purpose of determining and/or displaying operational condition(s) of the one or more power generation unit(s) 103. Among other applications, the unit evaluation system 124 includes a startup phase determination application 130 that is executed in order to determine the start and end times of one or more startup phase of a power generation unit 103 as will be described. The unit evaluation system 124 can also provide the ability to analyze and compare startup phases of power generation units 103 of similar technology types that have occurred across the fleet of power generation units 103.

The data stored in the data store 121 includes, for example, unit information 133 associated with the power generation unit(s) 103 such as operational data 136 and potentially other data. In addition, the unit information 133 includes startup conditions 139 corresponding to the startup phases of each power generation unit 103. For example, the startup conditions 139 may include, e.g., temperature and pressure criteria for various components of the power generation unit 103 that are associated with the start and/or end time(s) of a phase. Also stored in the data store 121 may be startup histories 142 that include, e.g., information corresponding to previous startups of one or more power generation unit(s) 103. Such information may include startup phase start and end times, startup phase durations, gaps between startup phases, operational data during the startup, and other information associated with an event as can be appreciated.

The user device 109 is representative of a plurality of user devices that may be communicatively coupled to the computing device 106 through a network 145 such as, e.g., the Internet, intranets, extranets, wide area networks (WANs), local area networks (LANs), wired networks, wireless networks, networks configured for communication over a power grid, or other suitable networks, etc., or any combination of two or more such networks. The networks 118 and 145 may be independent networks or may be separate or overlapping portions of a common network. In some embodiments, a user device 109 may be directly connected to the computing device 106.

The user device 109 may comprise, for example, a processor-based system such as a computer system. Such a computer system may be embodied in the form of a desktop computer, a laptop computer, a personal digital assistant, a cellular telephone, web pads, tablet computer systems, or other devices with like capability. The user device 109 includes a display device 148 upon which various network pages 127 and other content may be rendered. The user device 109 may be configured to execute various applications such as a browser application 151 and/or other applications. The browser application 143 may be executed in a user device 109, for example, to access and render network pages 127, such as web pages, or other network content served up by the computing device 106 and/or other servers. The user device 109 may be configured to execute applications beyond browser application 151 such as, for example, e-mail applications, instant message (IM) applications, and/or other applications.

Next, a general description of an example of the operation of the various components of the system 100 is provided. To begin, a user may have an interest in evaluating the startup of a power generation unit 103. As a result, the user may send an initiating request from a user device 109 to the unit evaluation system 124. In one implementation, the user may submit a batch request to determine the occurrence of an event associated with a power generation unit 103 located at a plant site 112 during a specified time period or time frame. For example, the user may initiate the evaluation by selecting a link on a network page 127 displayed on the user device 109 through a browser application 151. The unit evaluation system 124 (or other application executed by the computing device 106) may then generate one or more network page 127 for rendering by the user device 109 to obtain information from the user regarding the requested event evaluation. A network page 127 may be configured to allow identification of a power generation unit 103 to be evaluated and a time period or time frame for evaluation (e.g., starting and ending dates and times). In some implementations, the plant site 112 of the power generation unit 103 is initially specified to assist in identification of the power generation unit 103.

In other embodiments, an event is initially identified for a power generation unit 103 (e.g., through a pull down menu or other appropriate selection interface) and a network page 127 is generated for rendering by the user device 109 to obtain the time period for evaluation. For example, a unit 103 may be selected for evaluation from a listing 203 of power generation units 103 provided in a network page 127a such as the example illustrated in FIG. 2. The listing 203 may include information associated with the power generation units 103 such as, but not limited to, the operating company, the unit type and sub type, boiler technology type and sub type, and unit identifier (ID). The listing 203 may also include other information such as the number of events associated with the power generation unit 103, the number of event errors, and/or the number of predefined startup conditions or rules 139 (FIG. 1) associated with the power generation unit 103. The network page 127a may provide for filtering the displayed power generation units 103 based upon user specified criteria such as that included in the listing 203. The network page 127a may also provide for sorting of the listing 203, editing power generation units 103 in the listing 203, deleting power generation units 103 from the listing 203, and/or adding power generation units 103 to the listing 203, as well as exporting the listing 203 to a data processing application such as a spreadsheet application.

Referring to FIG. 3, shown is an example of a network page 127b configured to obtain information related to a startup event of the power generation unit 103 designated as Pierre 4. The event corresponds to an event identifier. In the example of FIG. 3, the startup event corresponds to event identifier (ID) #93. The network page 127b includes entry locations for estimated start and end dates and times 206, as well as an entry location for additional description information 209. The network page 127b may also include other information such as operating company, boiler technology type, and date/time of last phase evaluation.

In other embodiments, the unit evaluation system 124 may be configured to periodically determine if an event has been initiated or is scheduled to occur. For example, the unit evaluation system 124 may query one or more plant historian(s) 115 to determine if a startup event has been initiated. If a startup has been initiated, the unit evaluation system 124 initiate an evaluation of the event based upon predefined start and end dates and times with respect to the startup determination (e.g., a period starting a predefined period of time before the determination and ending a predefined period of time after the determination). If a startup event is scheduled, then the unit evaluation system 124 may perform an evaluation of the event for a predefined period based at least in part upon the scheduled startup.

Referring back to FIG. 1, the unit evaluation system 124 performs an evaluation of the event based upon the power generation unit 103 and time frame information identified by the user. The unit evaluation system 124 communicates with the plant historian 115 corresponding to the identified power generation unit 103 to obtain operational data associated with the identified power generation unit 103 and the identified time frame. The operational data 136 may then be stored in the data store 121. The operational data 136 includes data values that are periodically collected (e.g., minute-by-minute) by the plant historian 115 from data points associated with the power generation unit 103. For example, data values such as temperature, pressure, flow rate, tank level, etc. are periodically collected during operation of the power generation unit 103 from a variety of sensors installed at data points around the power generation unit 103. The operational data 136 may also include Boolean indications of the condition of various components of the power generation unit 103. For example, a true or false condition may be used to indicate whether a boiler has been ignited, a heater energized, or a valve is open or closed. The collection periods may be every minute, every two minutes, every five minutes, or other sampling intervals as can be understood. In some embodiments, data values from different data points may be collected using different sampling intervals. The collected data is stored in a data store associated with the plant historian 115. The operational data 136 may be stored individually with their corresponding collection time, as a group corresponding to a group collection time, or a combination thereof. In other implementations, the unit evaluation system 124 may communicate with a centralized data store to obtain collected data.

The operational data 136 collected from the data points is used to determine the start and end times of one or more event phases (e.g., startup phases) of the power generation unit 103. The operational data 136 is gathered for a specific time window around the time frame that was identified by the user. For example, a startup event may span 1-2 days with data collected from about 25 different data points resulting in about 25,000 distinct data values to be analyzed. The unit evaluation system 124 may obtain at least a portion of the operational data 136 collected from the data points during the specified time frame. In other implementations, the unit evaluation system 124 may obtain data collected from the data points during a specific time window that extends beyond the identified time frame.

At least a portion of the operational data 136 obtained by the unit evaluation system 124 is used to determine whether an event phase has occurred including the start and end times of the phase. In the example of FIG. 1, a startup phase determination application 130 is used to determine the start and end times for one or more startup phases of the power generation unit 103. The determination is based upon a set of predefined startup conditions or rules 139 that are used to evaluate the operational data 136 obtained from the plant historian 115. For example, as discussed above, a fossil fuel unit startup event may include four startup phases: (1) a boiler firing phase; (2) a boiler ramping phase; (3) a turbine rolling phase; and (4) a turbine loading phase. Each startup phase has associated with it sets of one or more predefined conditions or rules corresponding to the start of the phase and the end of the phase. TABLE 1 provides a non-exhaustive listing of examples of various startup conditions 139 corresponding to the four startup phases. Other conditions may be defined for each phase as can be understood. In some implementations, only a portion of the predefined conditions may be used in the phase determination. For example, feed water flow rates in TABLE 1 are inactive and thus not considered during the phase determination. In some cases, the startup conditions 139 corresponding to the end time of a phase may be the same as the startup conditions 139 corresponding to the start time of the next phase.

To determine the start and end times of a startup phase, the startup phase determination application 130 compares the predefined conditions for each startup phase to the obtained operational data 136 for the corresponding data points within the specific time window. For example, in the example of the boiler firing phase of TABLE 1, the periodically collected boiler fluid temperature, fire in the boiler, and separator tank pressure are compared to the predefined startup conditions 139 for each of the collection intervals or periods. As indicated in TABLE 1, the feed water flow rates have been inactivated and thus are not considered by the startup phase determination application 130 during its evaluation.

When the operational data 136 corresponding to a given collection period satisfy all of the predefined startup conditions 139 corresponding to the start of the boiler firing phase, the time when all conditions are satisfied may be defined as the phase starting time. In some embodiments, the predefined startup conditions 139 must be continuously satisfied for a predefined period of time or number of collection periods before a phase is determined to have started. If one or more data value(s) does not satisfy the corresponding predefined startup conditions 139 during the predefined period of time or number of collection periods after the predefined startup conditions 139 were initially satisfied, then the phase is determined not to have started. For example, assume that operational data 136 is collected from data points at every five minute interval and that a phase is considered to have started when the predefined startup conditions 139 have been satisfied for four consecutive intervals (or a period of at least 15 minutes).

TABLE 1

| | Predefined startup condition | |
|---|---|---|
| Boiler firing phase | | |
| START | Boiler Fluid Temp ≥ 100° F. | Active |
| START | FW Flow Rate < 575 KLB\HR | Inactive |
| START | FW Flow Rate > 500 KLB\HR | Inactive |
| START | Fire In Boiler = True | Active |
| START | Tank Pressure (Separator) < 30 psi | Active |
| START | Tank Pressure (Separator) > 0 psi | Active |
| END | Boiler Fluid Pressure ≥ 950 psi | Active |
| END | Boiler Fluid Temperature ≥ 400° F. | Active |
| END | Tank Pressure (Separator) > 100 psi | Active |
| Boiler ramping phase | | |
| START | Boiler Fluid Pressure ≥ 1000 psi | Active |
| START | Boiler Fluid Temp ≤ 450° F. | Active |
| START | Boiler Fluid Temp ≥ 400° F. | Active |
| START | FW Flow Rate > 500 KLB\HR | Inactive |
| START | FW Flow Rate > 500 KLB\HR | Inactive |
| END | Boiler Fluid Pressure ≥ 3500 psi | Active |
| END | Boiler Fluid Temperature ≤ 515° F. | Active |
| END | Boiler Fluid Temperature ≥ 500° F. | Active |
| Turbine rolling phase | | |
| START | Lube Oil Temperature ≥ 85° F. | Active |
| START | Turbine Metal Temp (1$^{st}$ Stage) ≥ 300° F. | Active |
| START | Turbine Speed < 10 RPM | Active |
| END | Lube Oil Temperature ≥ 100° F. | Active |
| END | Turbine Speed ≥ 3000 RPM | Active |

TABLE 1-continued

Predefined startup condition

Turbine loading phase

| | | |
|---|---|---|
| START | Boiler Fluid Temperature > 750° F. | Active |
| START | Flash Tank Pressure ≥ 900 psi | Active |
| START | Turbine Speed ≤ 3602 RPM | Inactive |
| START | Turbine Speed ≥ 3598 RPM | Active |
| START | Unit Load ≥ 35 | Active |
| END | Unit Load ≥ 150 | Active |

The startup phase determination application 130 compares at least a portion of the operational data 136 obtained by the unit evaluation system 124 to the predefined startup conditions 139 at each time interval. When the conditions are met with a first set of operational data 136, then the startup phase determination application 130 checks the subsequent sets of operational data 136 to determine if the predefined startup conditions 139 have been satisfied for four consecutive intervals. If so, then the time corresponding to the first satisfied time interval is defined as the start time for the associated startup phase by the startup phase determination application 130. If one of the subsequent sets of operational data 136 fails to satisfy the predefined startup conditions 139, then the startup phase determination application 130 repeats the comparison of subsequent sets of operational data 136 to determine if the predefined startup conditions 139 have been satisfied for the predefined period of time or number of collection periods to determine the start time of the startup phase.

A network page 127 may be provided to a user device 109 that allows a user to define rule templates that determine the predefined startup conditions 139 used to determine the start and end time of the phases within a startup event for each technology type (or boiler type). The network page 127 may be configured to provide the user with the ability to view, sort, edit, delete, and insert rule templates. The network page 127 may also allow for export of the rule template list in a comma-delimited format that is compatible with a spread sheet application such as, e.g., Microsoft Excel. The rule templates can include the technology type, event phase and applicability to start or end time of the phase, one or more limiting values and their associated operator (e.g., equal to or greater than), a description of the rule and an indication of whether the rule is active (enabled) or inactive (disabled).

The unit evaluation system 124 matches the rule templates to a power generation unit 103 based at least in part upon the unit's technology type. A specific power generation unit 124 will have a set of rules defined based on the rule template that corresponds to its technology type. The same or another network page 127 may allow a user to define the specific predefined startup conditions 139 or rules that are utilized to determine the phase start and end times of an event based on the rule templates. For a selected power generation unit 103, a network page may be generated that, when rendered, displays one line for each rule from the applicable rule templates. The user may then define or select the specific data point of the power generation unit 103 that will be utilized in each particular rule. For example, a power generation unit 103 may include a plurality of data points that may be associated with a rule template. A pull-down menu in the network page 127 may be used to select the data point corresponding to the rule.

In some implementation, a list of rules associated with a power generation unit 103 may be provided in a network page 127. The network page 127 may allow the user to view, sort, and edit rules for a power generation unit 103 based on the defined rule templates, as well as export the rules list to a spreadsheet and/or database application.

Figure 4:
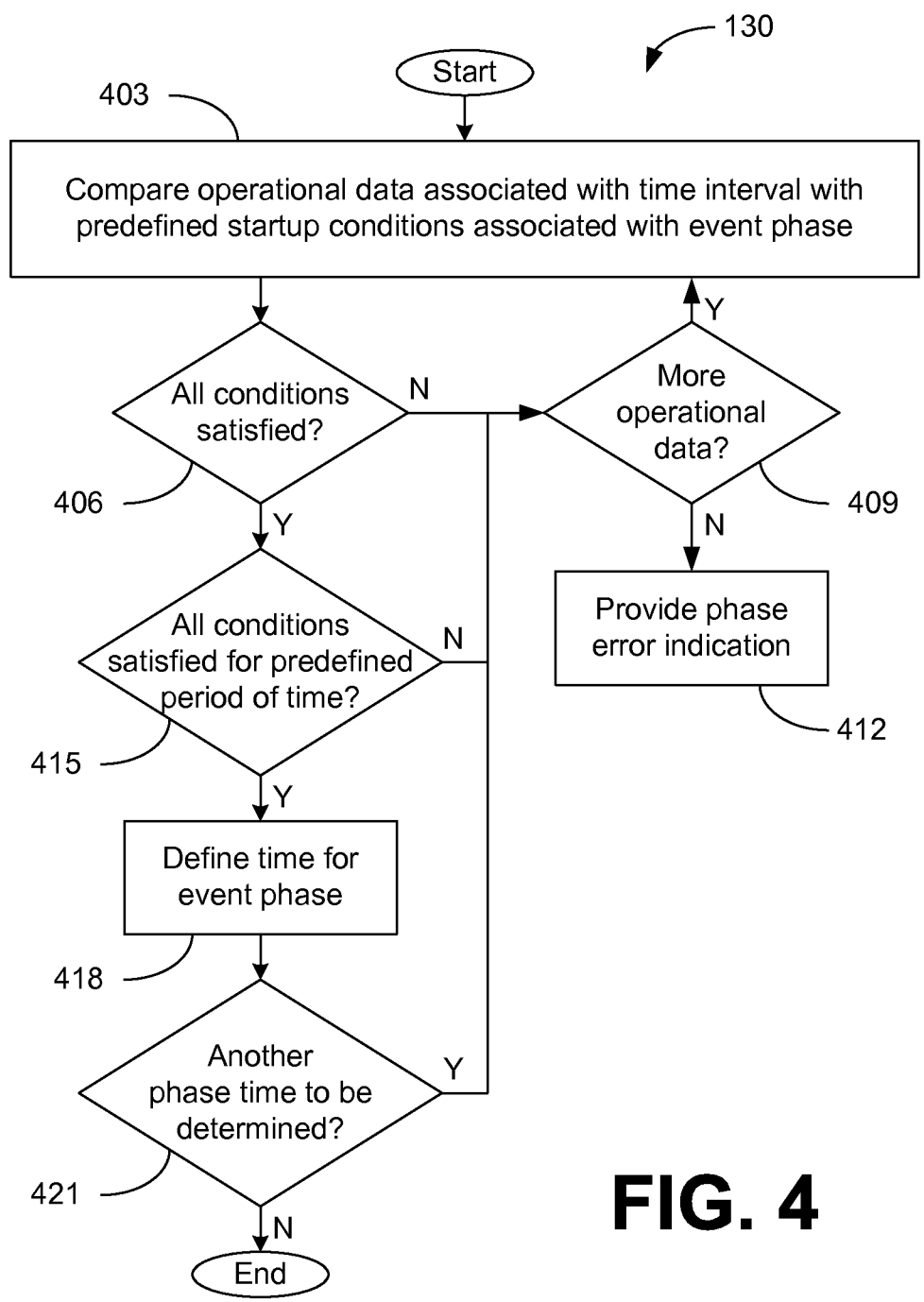
FIG. 4 is a flow chart illustrating an example of the determination of start and end times of an event phase by the system of FIG. 1 in accordance with various embodiments of the present disclosure.

Referring to FIG. 4, shown is a flow chart illustrating an example of the determination of start and end times of a startup phase by the startup phase determination application 130 (FIG. 1). The determination is based upon at least a portion of the operational data 136 (FIG. 1) associated with the identified power generation unit 103 (FIG. 1) and the identified time frame that was obtained by the unit evaluation system 124 (FIG. 1). To begin, to determine the start time of a first startup phase, operational data 136 associated with an initial time interval is compared with predefined startup conditions 139 (FIG. 1) associated with a startup phase in block 403. If one or more of the predefined startup condition(s) 139 associated with the startup phase is/are not satisfied in block 406, then the startup phase determination application 130 confirms whether there is operational data 136 associated with the identified power generation unit 103 (FIG. 1) and the identified time frame that is available for comparison. If there is no more operational data 136, then a phase error indication is provided in block 412. For example, the error indication may indicate that no event occurred during the identified time frame or that the start and/or end time of a phase was not identified within the identified time frame.

If there is additional operational data available in block 409, then the startup phase determination application 130 returns to block 403 to compare the operational data 136 associated with the next time interval with the predefined startup conditions 139 associated with the startup phase. This cycle (blocks 403, 406, and 409) repeats until operational data 136 for an interval satisfies all of the predefined startup conditions 139 associated with the startup phase in block 406. If all of the predefined startup conditions 139 are satisfied, then the startup phase determination application 130 checks in block 415 whether the predefined startup conditions 139 associated with the startup phase have been satisfied for a predefined period of time (e.g., one or more collection periods). In some implementations, the predefined period of time may correspond to a single interval or collection period. In other embodiments, the predefined period of time may correspond to a plurality of collection periods or intervals. If the predefined startup conditions 139 have not been satisfied for the predefined period of time, then in block 409 the startup phase determination application 130 determines if additional operation data is available and, if so, returns to block 403 to compare operational data 136 associated with the next time interval with the predefined startup conditions 139 associated with the startup phase. This cycle (defined by blocks 403, 406, 415, and 409) repeats until operational data 136 satisfies the predefined startup conditions 139 over the entire predefined period of time.

When the predefined startup conditions 139 have been satisfied over the entire predefined period to time, a start or end time for the startup phase is defined in block 418. For example, the start time for the first startup phase may be defined as the time corresponding to the time of the first set of operational data 136 that satisfied the predefined startup conditions 139 in the predefined period of time. If the predefined period of time corresponds to four sequential intervals and the operational data 136 for four sequential intervals satisfies the predefined startup conditions 139, then the start time for the startup phase is defined to be the time corresponding to the first interval.

If another time needs to be determined in block 421 (e.g., the end time for the startup phase or the start time for the next startup phase), then in block 409 the startup phase determination application 130 determines if additional operation data is available and, if so, returns to block 403 to compare operational data 136 associated with the next time interval with the predefined startup conditions 139 associated with the startup phase. The steps described above are repeated to determine the next phase time such as, e.g., the end time of the initial startup phase. As discussed above, the startup phase determination application 130 checks in block 415 whether the predefined startup conditions 139 associated with the startup phase have been satisfied for a predefined period of time (e.g., one or more collection periods). If the predefined startup conditions 139 have been satisfied for the predefined period of time, then in block 418 the end time of the startup phase is defined. For example, the end time for the first startup phase may be defined as the time corresponding to the time of the last set of operational data 136 that satisfied the predefined startup conditions 139 in the predefined period of time. If the predefined period of time corresponds to four sequential intervals and the operational data 136 for four sequential intervals satisfies the predefined startup conditions 139, then the end time for the startup phase is defined to be the time corresponding to the fourth interval. In some cases, the predefined startup conditions corresponding to the end time of a phase are the same as the predefined startup conditions corresponding to the start time of the next phase. Thus, the start time for the next startup phase may be defined in block 418. The sequence ends when another start or end time is not needed.

In some implementations, instead of providing an error indication in block 412, the startup phase determination application 130 may request that the unit evaluation system 124 communicate with the plant historian 115 corresponding to the identified power generation unit 103 to obtain additional operational data 136 associated with the identified power generation unit 103 that was collected after the identified time frame. For example, when it is determined in block 409 that no additional operational data 136 is available, then the startup phase determination application 130 requests the unit evaluation system 124 to obtain the additional operational data 136 and returns to block 403 for comparison of the newly obtained operational data 136 with the predefined startup conditions 139. The unit evaluation system 124 may obtain operational data 136 for a time period corresponding to a single interval or to a predefined length of time or a predefined number of periods or intervals. In some embodiments, the predefined time period may be based upon the startup phase for which the start or end time is being determined.

The unit evaluation system 124 can store the obtained operational data 136, predefined startup conditions 139, and/or startup histories including the start and end times for each startup phase of the power generation unit 103 startup. In addition to the operational data 136 corresponding to the predefined startup conditions 139, other operational data 136 may be obtained and stored in the data store 121. While not necessary for the determination of the start and end times of the startup phases, the additional operational data 136 collected from other data points may be used for more detailed analysis of the operation of the power generation unit 103 during the startup phase. While the startup phase determination application 130 has been described in the context of the startup of a power generation unit 103, the flow chart of FIG. 4 may be utilized for evaluation of other events associated with power generation units 103 such as repeated plant evolutions or plant shutdowns. One or more phases may be identified for the event and the start and end times determined as described above with respect to a startup event.

The evaluated information associated with the event phases may be provided through a network page that includes a combination of tables, lists, graphical representations, and/or interactive interfaces for rendering by the user device 109 (FIG. 1). In addition, other operational information associated with the event phase may also be provided. For example, the event phase information may be provided as a phase time report including, e.g., dates and times for each event phase and the overall event duration, duration (or time from start to finish) of each phase, optimal and/or average event phase time and/or overall time for similar units; a reliability report including, e.g., average values for operational data during an event phase, operational limits (e.g., upper limit, lower limit, and/or operational range) for operational data, and/or the percentage (or amount) of time that operational data value violated an operational limit, a phase trending report, a phase time legend report, or another report or combination of reports as can be appreciated.

In some implementations, a listing of available reports may be provided in a network page 127 to allow for selection of one or more reports by a user. For example, when a report is selected, it may be generated by the unit evaluation system 124 based upon the determined start and end times of the evaluated event and provided for rendering in another network page 127. The generated report may also be stored in the data store 121 for subsequent retrieval and rendering by a user device 109. In some cases, report information associated with, e.g., startup events associated with a plurality of power generation units 103 and/or a plurality of startup events associated with a power generation unit 103 may be provided in a report for comparison and evaluation. In some embodiments, the user designates a combination of current and/or previously evaluated events for inclusion in the report. The evaluated information may also be provided in a printable format or a format suitable for export to another application (e.g., a spread sheet or data base application) for further processing, formatting, and/or evaluation.

Figure 5:
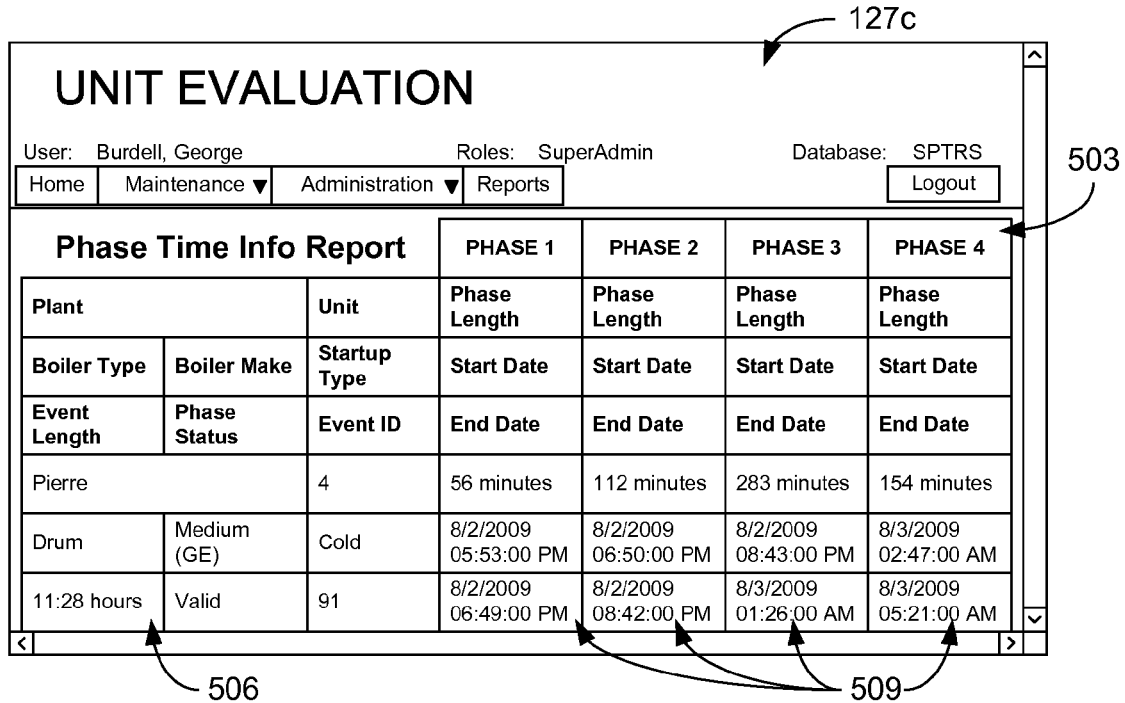
FIGS. 5-11 illustrate examples of network pages including reports including information associated with the event evaluated in FIG. 3 in accordance with various embodiments of the present disclosure.

Referring to FIG. 5, shown is an example of a network page 127c including a phase time information report 503 that allows the user to quickly view the events, phase times, technology type, and cold vs. hot startup type for a user-selected power generation unit 103 or group of power generation units 103. The phase time information report 503 may include overall event information 506 and individual phase information 509. In the example of FIG. 5, phase 2 information has not been included in the displayed network page 127c. While the example of FIG. 5 illustrates information of a single startup event associated with one power generation unit 103 (e.g., the unit designated as Pierre 4), the phase time information report 503 may also include information corresponding to multiple startup events associated the power generation unit 103 and/or startup events associated with a plurality of power generation units 103. The event information for all of the startup events can be presented in a single table for display in the network page 127c. For example, overall event information 506 and individual phase information 509 corresponding to a startup event for another power generation unit 103 may be included after the information corresponding to the startup event illustrated in FIG. 5.

Figure 6:
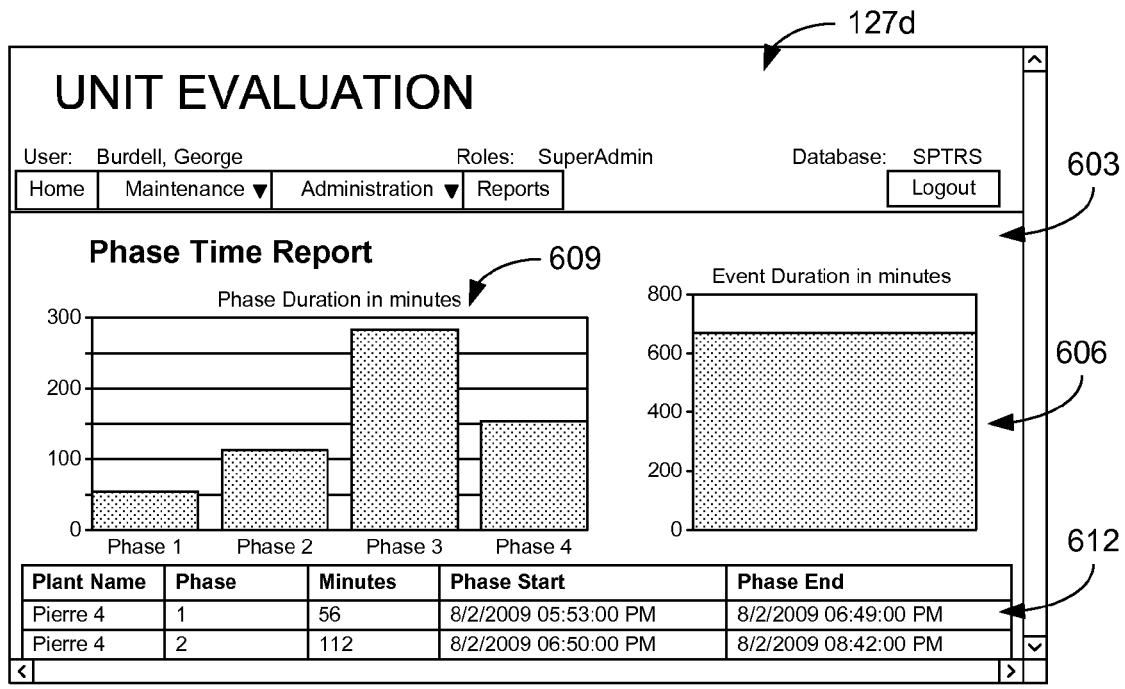
Figure 7:
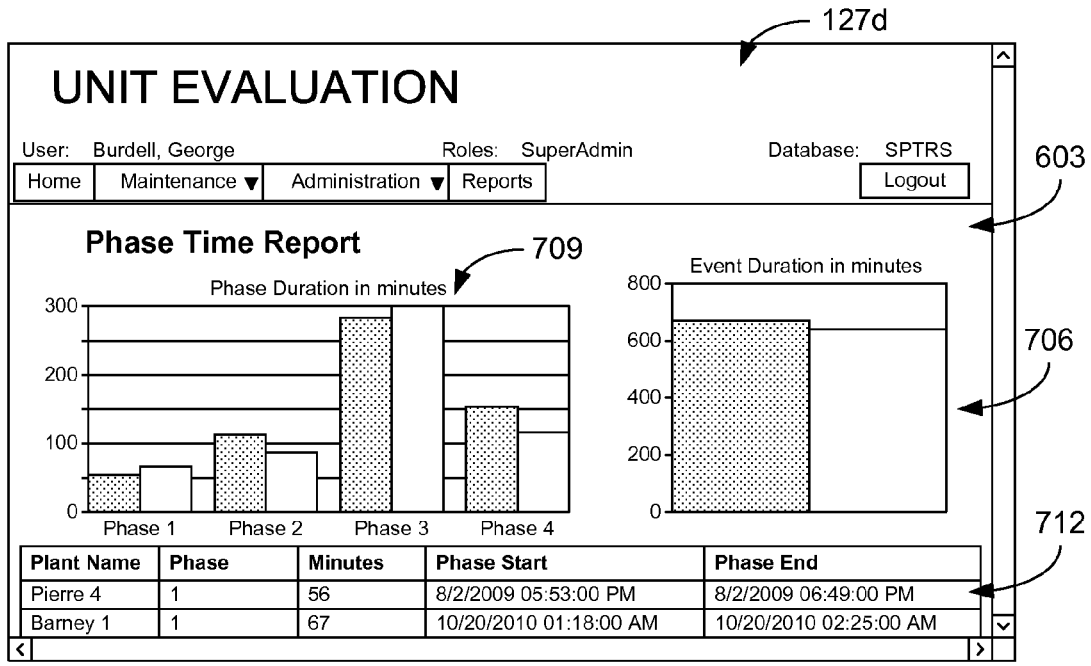

The phase time information may also be graphically represented in a network page 127. Referring next to FIG. 6, shown is an example of a network page 127d including a phase time report 603 including graphical representations of the duration of the overall event 606 and of each phase 609 in minutes. In addition, other phase information 612 (e.g., individual phase information) may be presented in the phase time report 603. Multiple events may also be graphically represented in the same phase time report. The phase time report 603 may also include phase and overall duration of for a plurality of events for the same or similar power generation units 103 (FIG. 1). For example, FIG. 7 depicts a network page 127d with a phase time report 603 including graphical representations of the duration of the overall event 706 and of each phase 709 for two power generation units 103 (e.g., Pierre 4 and Barney 1) with the same boiler technology type. Phase information 712 for the two power generation units 103 may also be included for side-by-side comparison.

Figure 8:
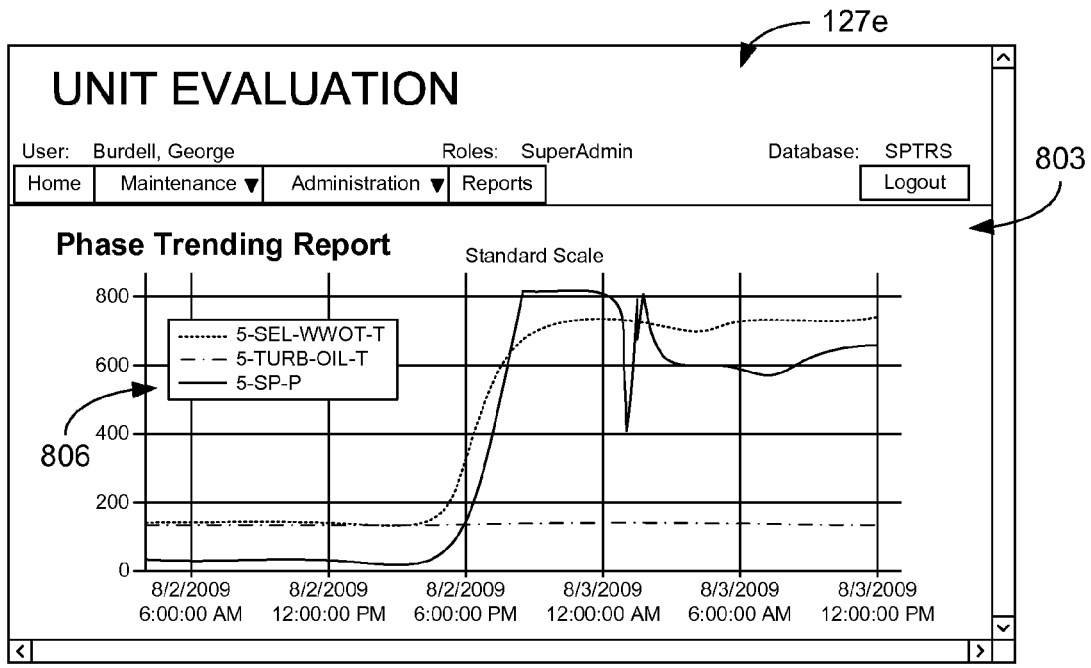

Referring now to FIG. 8, shown is an example of a network page 127e including a phase trending report 803 including operational data values associated with an event. A legend 806 can be provided for identification of the plotted values. For example, the phase trending report may include one or more value(s) of operational data 136 (FIG. 1) corresponding to the predefined startup condition(s) 139 (FIG. 1) associated with a startup phase. In the example of FIG. 8, three operational data values are graphically represented over a startup phase of a current or previously evaluated startup event. The graphical representation may include operational data values for a predefined period before the start time and/or after the end time of the event phase. In other implementations, the operational data values may be graphically represented over a portion or the entire startup event. The network page 127e may also allow a user to actively adjust the displayed portion of the startup event.

A set of user specified operational data 136 for one or more events may also be graphically represented in a phase trending report 803. For example, the turbine oil temperature for a plurality of startup events associated with a power generation unit 103 (FIG. 1) may be plotted for comparison. The user specified operational data 136 to be provided in the phase trending report 803 may be selected through one or more network page links, menus and/or other network page options as can be appreciated. As discussed above, the user selected operational data 136 may include the operational data 136 corresponding to the predefined startup conditions 139 as well as additional operational data 136 that is not used to determine the start and end times of one or more event phases (e.g., startup phases) but is collected by the plant historian 115 (FIG. 1) from other data points during the startup phase of the power generation unit 103.

Figure 9:
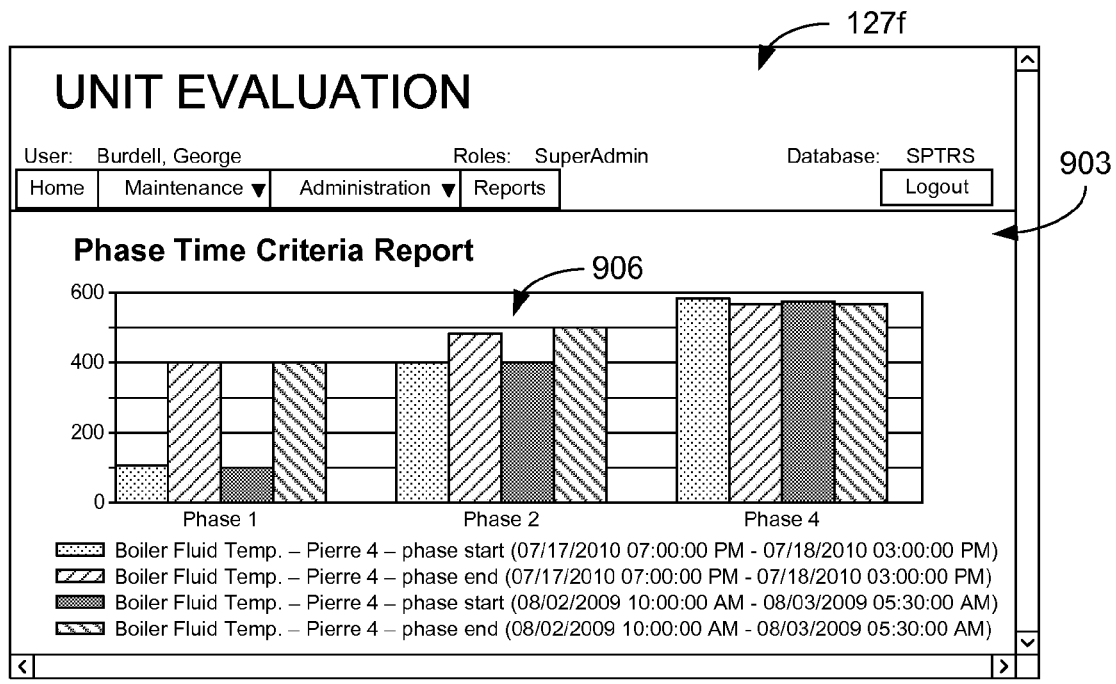

Comparison of operational data 136 at the start and end times of the event phases may also be provided through phase time criteria reports. Referring to FIG. 9, shown is an example of a network page 127f including a phase time criteria report 903 with bar graphs 906 indicating the start and end values of operational data 136 that was specified by a user. In the example of FIG. 9, the start and end values of the user specified operational data (boiler fluid temperature) for three startup phases of two user specified startup events of the same power generation unit 103 (Pierre 4) are provided for comparison. The user may specify one or more phases of a plurality of events to be displayed.

Figure 10:
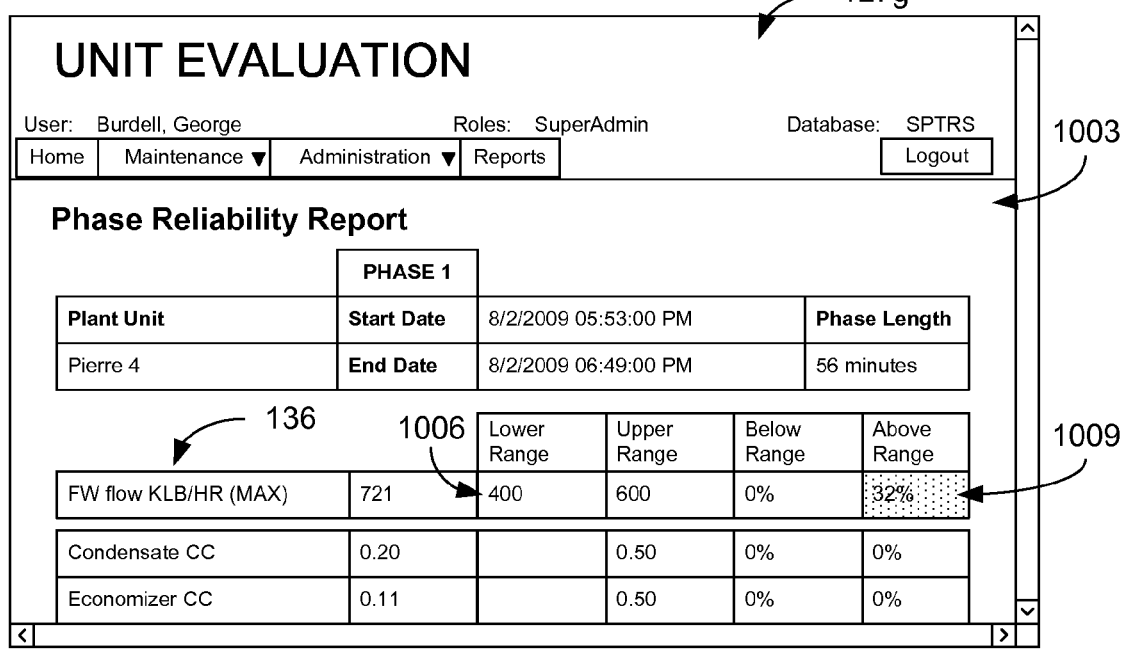

Operational data 136 for one or more event phase may also be provided in a reliability report with respect to corresponding operational ranges. Referring next to FIG. 10, shown is an example of a network page 127g including a reliability report 1003 for a determined event phase. In the example of FIG. 10, the reliability report 1003 indicates the relationship of various operational data 136 with respect to corresponding upper and/or lower ranges 1006 (or limits) during the first phase of a startup event. In some cases, only an upper limit or a lower limit will apply to the operational data 136. The operational data 136 may be compared to the upper and/or lower ranges 1006 (or limits) by the unit evaluation system 124 to determine when the power generation unit 103 was operating outside the upper and/or lower ranges 1006. The phase reliability report 1003 provides an indication of the amount of time during the event phase (or percentage of the startup phase) 1009 that the operation data was above or below the operational range. For example, in FIG. 10, the upper and lower limits 1006 corresponding to feed water flow are indicated. The feed water flow was above the upper range for 32% of the total phase time with the maximum feed water flow indicated. Indications of the severity of the violation may be provided by coloring and/or shading of the values 1009. Other reports, such as the phase trending report 803 (FIG. 8), may be used to illustrate the variation of the operational data values during the startup phase.

While the example of FIG. 10 depicts the evaluation of operational data 136 during a single phase of the startup event, the phase reliability report 1003 may include evaluation of operational data 136 over a plurality of event phases. For example, indications of the feed water flow (as well as other operational data 136) over two or more of the phases may be provided in the phase reliability report 1003. The operational data 136 may include the operational data 136 corresponding to the predefined startup conditions 139 and/or additional operational data 136 that is not used to determine the start and end times of one or more event phases (e.g., startup phases) but is collected by the plant historian 115 (FIG. 1) from other data points during the startup phase of the power generation unit 103. The additional operational data 136 may be used to determine the causes of startup variations between power generation units 103.

In some implementations, the unit evaluation system 124 may be configured to evaluate a combination of current and previous operational data associated with one or more power generation units 103 of the same technology type to determine a possible cause for variations in the event phases. For example, the unit evaluation system 124 may utilize pattern recognition methods such as, e.g., neural networks, statistical analysis, expert systems, or other appropriate method to identify potential causes or reasons for delay in a startup phase. In some embodiments, operational data from a plurality of events may be analyzed by the unit evaluation system 124. In other implementations, current operational data 136 may be compared to a baseline that was determined by the unit evaluation system 124 or defined by a user based at least in part upon previous operational data 136 from the same power generation unit 103 or other power generation units 103 of the same technology type. The unit evaluation system 124 may then provide a recommendation to a user through a network page 127.

Figure 11:
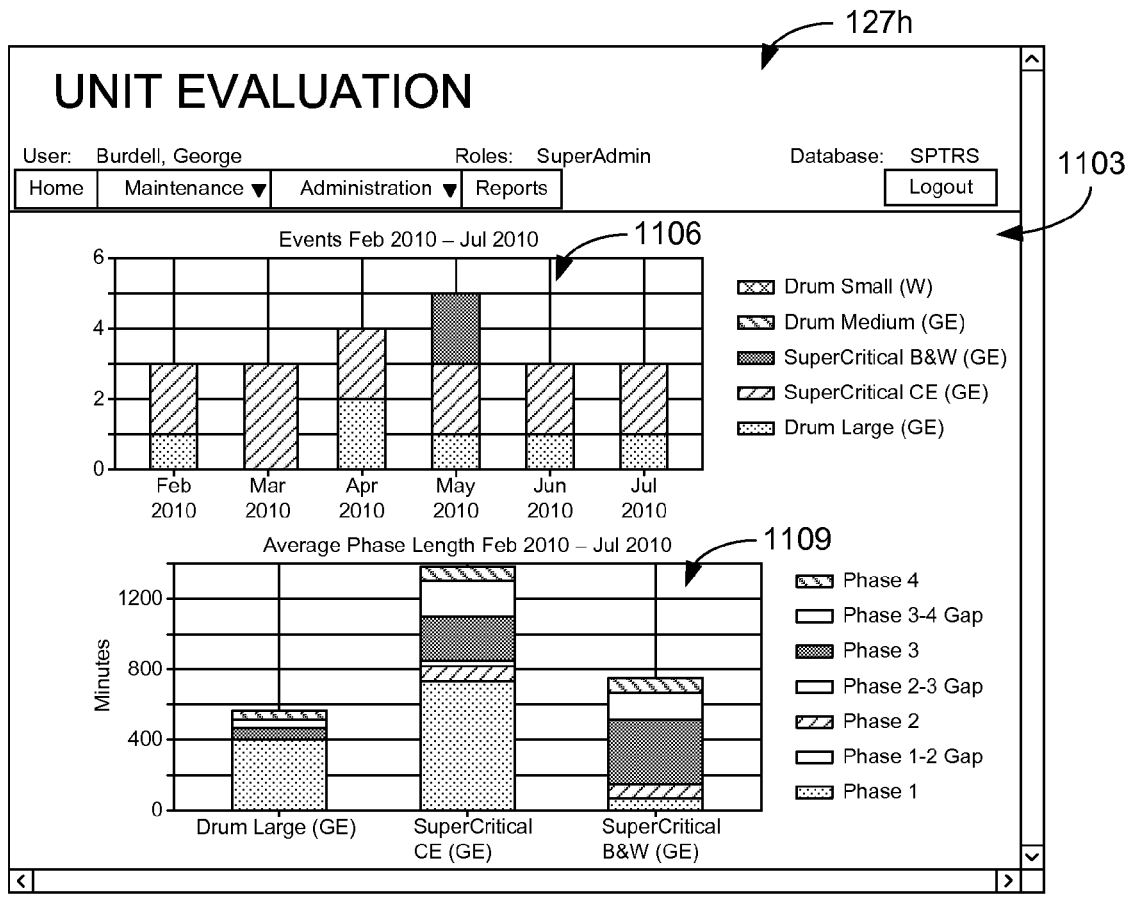

An overview of evaluated events that have occurred during a user defined time period may also be provided by the unit evaluation system 124 in a network page 127. FIG. 11 is an example of a network page 127h including an overview of evaluated events 1103. The overview 1103 provides a user with the ability to view event information in a graphical display over a specified time period for a set of user-selected criteria based on, e.g., unit, technology, and start-up type. In response to a user request, the unit evaluation system 124 may obtain startup histories 142 (FIG. 1) for evaluated events that occurred within the defined time interval. The overview 1103 may include a bar chart 1106 indicating the evaluated events that have occurred over the user specified time period based upon the technology type. In the example of FIG. 11, the events are indicated on a monthly interval; however other intervals (e.g., daily, weekly, biweekly, etc.) may be used.

The overview 1103 may also a bar chart 1109 indicating the average phase lengths (in minutes) for the evaluated events for each technology type within the specified time period based upon the startup history 142. Links within the generated network page 127h can allow users to click within the charts 1106 and 1109 to access more detailed charts and data, as well as showing specific details about the data upon which the charts are based. For example, the unit evaluation system 124 may provide one or more listing(s) of events that may be searched, sorted, and edited by a user. A listing of events can include, e.g., plant unit, technology type (and subtype), estimated start and end dates and times of the event, determined start and end dates and times of the event, event length, and other information associated with an evaluated event. Process logs including, e.g., a detailed log of actions and issues encountered by the unit evaluation system 124 may also be accessed through a network page 127. The process logs may allow a user to get detailed information about the execution cycle of the evaluation.

Figure 12:
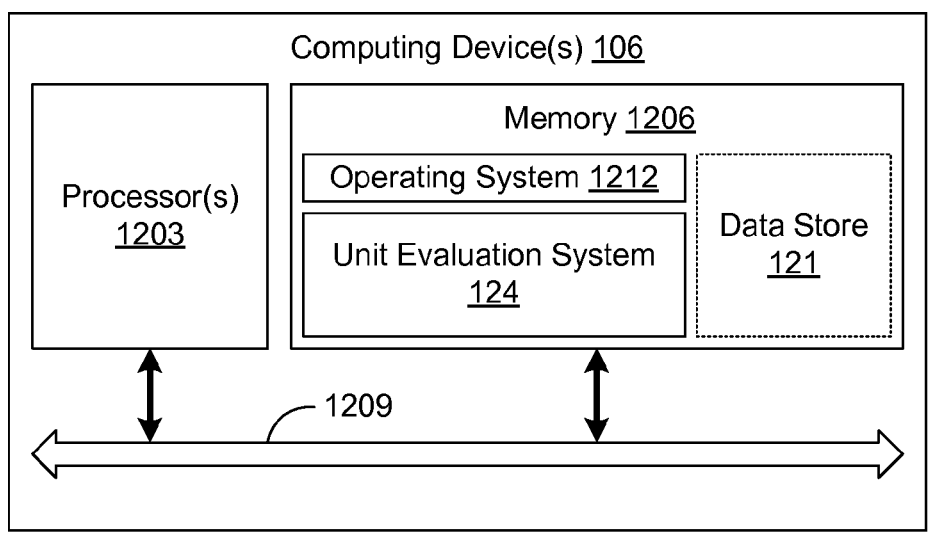
FIG. 12 is a schematic block diagram that provides one example illustration of a computing device employed in the system of FIG. 1 according to various embodiments of the present disclosure.

With reference to FIG. 12, shown is a schematic block diagram of a computing device 106 according to an embodiment of the present disclosure. The computing device 106 includes at least one processor circuit, for example, having a processor 1203 and a memory 1206, both of which are coupled to a local interface 1209. To this end, the computing device 106 may comprise, for example, at least one server computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the unit evaluation system 124, including a phase determination application 130 (FIG. 1), and potentially other applications. Also stored in the memory 1206 may be a data store 121 and other data. In addition, an operating system 1212 may be stored in the memory 1206 and executable by the processor 203.

It is understood that there may be other applications that are stored in the memory 1206 and are executable by the processors 1203 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc. An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the unit evaluation system 124, and more specifically, the startup phase determination application 130, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flow chart of FIG. 4 shows functionality and operation of an implementation of portions of a unit evaluation system 124 including the startup phase determination application 130. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flow chart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the unit evaluation system 124, and more specifically, the startup phase determination application 130, that comprises software or code can be embodied in any non-transitory computer-readable medium for use by or in connection with an instruction execution system such as, for example, a processor 1203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method, comprising the steps of:
    obtaining, by at least one computing device, operational data associated with a power generation unit, the operational data corresponding to a predefined period of time;
    determining, by the at least one computing device, a start time and an end time for a startup phase associated with the power generation unit based upon at least a portion of the operational data and a set of predefined startup conditions corresponding to the startup phase;
    generating, by the at least one computing device, a network page for rendering on a user device, the network page including the start time and end time for the startup phase.

2. The method of claim 1, wherein the operational data is obtained from a plant historian associated with the power generation unit.

3. The method of claim 1, further comprising obtaining, by the at least one computing device, an estimated start time and an estimated end time corresponding to the predefined period of time.

4. The method of claim 1, further comprising determining, by the at least one computing device, a start time and an end time for a plurality of startup phases associated with the power generation unit, the start time and the end time of each startup phase based upon at least a portion of the operational data and a set of predefined startup conditions corresponding to that startup phase.

5. The method of claim 1, further comprising:
    obtaining, by the at least one computing device, a start time and an end time determined for a corresponding startup phase of at least one previous startup event associated with the power generation unit; and
    generating, by the at least one computing device, a network page including a comparison of the determined startup phase times.

6. The method of claim 1, further comprising:
    determining whether operational data associated with a data point of the power generation unit varied outside a corresponding operational range between the start time and the end time of the startup phase;
    providing, in a network page, an indication that the operational data associated with the data point was outside the corresponding operational range during the startup phase.

7. The method of claim 6, wherein the indication includes a percentage of the startup phase time that the operational data was outside the corresponding operational range.

8. The method of claim 1, further comprising:
    obtaining, by the at least one computing device, a start time and an end time determined for a corresponding startup phase associated with another power generation unit; and
    generating, by the at least one computing device, a network page including a comparison of the determined startup phase times.

9. The method of claim 1, further comprising:
    obtaining operational data associated with a plurality of power generation units having the same technology type, the operational data corresponding to a common startup phase associated with the technology type; and
    determining a baseline based at least in part upon the obtained operational data.

10. The method of claim 9, further comprising comparing operational data associated with one of the plurality of power generation units with the baseline to identify potential causes for variations in the startup phase time.

11. A system, comprising:

at least one computing device; and a unit evaluation system executable in the at least one computing device, the unit evaluation system comprising:

logic that obtains operational data associated with a power generation unit, the operational data corresponding to a predefined period of time;

logic that determines a start time and an end time for an event phase associated with the power generation unit based upon at least a portion of the operational data and a set of predefined conditions corresponding to the event phase; and logic that generates a network page for rendering on a user device based at least in part upon the determined start time and end time for the event phase.

12. The system of claim 11, wherein the event phase is a startup phase.

13. The system of claim 11, wherein determining the start time for the event phase comprises iteratively comparing operational data associated with a series of time intervals to predefined conditions corresponding to the start of the event phase.

14. The system of claim 13, wherein the start time is determined when the corresponding predefined conditions are concurrently satisfied for a predefined period of time.

15. The system of claim 14, wherein the predefined period of time is a single time interval.

16. The system of claim 13, wherein determining the end time for the event phase comprises iteratively comparing operational data associated with a series of time intervals to predefined conditions corresponding to the end of the event phase after the start time has been determined.

17. The system of claim 16, wherein the end time is determined when the corresponding predefined conditions are concurrently satisfied for a predefined period of time.

18. The system of claim 17, wherein the start time of the next event phase is the end time of the previous event phase.

19. A non-transitory computer-readable medium embodying a program executable in a computing device, the program comprising:

code that, when executed by the computing device, obtains operational data associated with a power generation unit, the operational data corresponding to a predefined period of time;

code that, when executed by the computing device, determines a start time and an end time for a startup phase associated with the power generation unit based upon at least a portion of the operational data and a set of predefined startup conditions corresponding to the startup phase;

code that, when executed by the computing device, generates a network page including operational data based upon the determined start time and end time of the startup phase; and code that, when executed by the computing device, provides the generated network page to a user device for rendering.

20. The non-transitory computer-readable medium of claim 19, wherein the program further comprises code that, when executed by the computing device, generates a network page configured to obtain the predefined period of time.

\* \* \* \* \*